United States Patent
Rozsypal et al.

(10) Patent No.: US 7,688,052 B2
(45) Date of Patent: Mar. 30, 2010

(54) CHARGE PUMP CIRCUIT AND METHOD THEREFOR

(75) Inventors: Antonin Rozsypal, Hutisko-Solanec (CZ); Jan Grulich, Litomysl (CZ); Karel Ptacek, Roznov Pod Radh. (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 445 days.

(21) Appl. No.: 11/566,965

(22) Filed: Dec. 5, 2006

(65) Prior Publication Data

US 2008/0129372 A1    Jun. 5, 2008

(51) Int. Cl.
G05F 1/595 (2006.01)
(52) U.S. Cl. .................... 323/282; 323/284; 327/536
(58) Field of Classification Search ................. 257/299; 323/271, 901, 828, 284; 327/536; 363/49, 363/59–60, 147
See application file for complete search history.

(56) References Cited

U.S. PATENT DOCUMENTS

| | | | |
|---|---|---|---|
| 6,097,075 A | 8/2000 | Rozsypal et al. | |
| 6,304,467 B1 * | 10/2001 | Nebrigic | 363/49 |
| 6,636,103 B2 * | 10/2003 | Wurcer et al. | 327/536 |
| 6,812,782 B2 * | 11/2004 | Grant | 327/589 |
| 6,836,173 B1 * | 12/2004 | Yang | 327/390 |
| 2005/0104651 A1 * | 5/2005 | Hashimoto | 327/536 |
| 2005/0212587 A1 | 9/2005 | Meek et al. | |

* cited by examiner

Primary Examiner—Jeffrey L Sterrett
Assistant Examiner—Fred E Finch, III
(74) Attorney, Agent, or Firm—Robert F. Hightower (57) ABSTRACT

In one embodiment, a charge pump circuit is used to keep a boost capacitor of a power supply system charged while the switch transistors are not switching such as when the power supply system is operating in a burst mode of operation.

21 Claims, 5 Drawing Sheets

CHARGE PUMP CIRCUIT AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form power supply controllers that would assist in regulating an output voltage to a desired value. In some power supply configurations, two transistors were connected in a stacked configuration or half-bridge circuit configuration in order to drive an inductor and form the output voltage. Each of the two transistors in the half-bridge circuit were driven by separate transistor drivers. The high side driver generally operated from a higher supply voltage than the low side driver. The higher power supply voltage often was referred to as a boost voltage and was developed by a bootstrap circuit from the voltage at a common node connection between the high side and low side transistors. In some operating modes, the two transistors may not be switched for a period of time. These periods of non-switching were often referred to as burst mode or cycle-skipping. During such time periods, the value of the boost voltage often decreased which caused inefficient operation of the power supply system.

Accordingly, it is desirable to have a power supply controller that can provide power to the high side driver during time periods that the power switches are not switching.

DETAILED DESCRIPTION OF THE DRAWINGS

Figure 1:
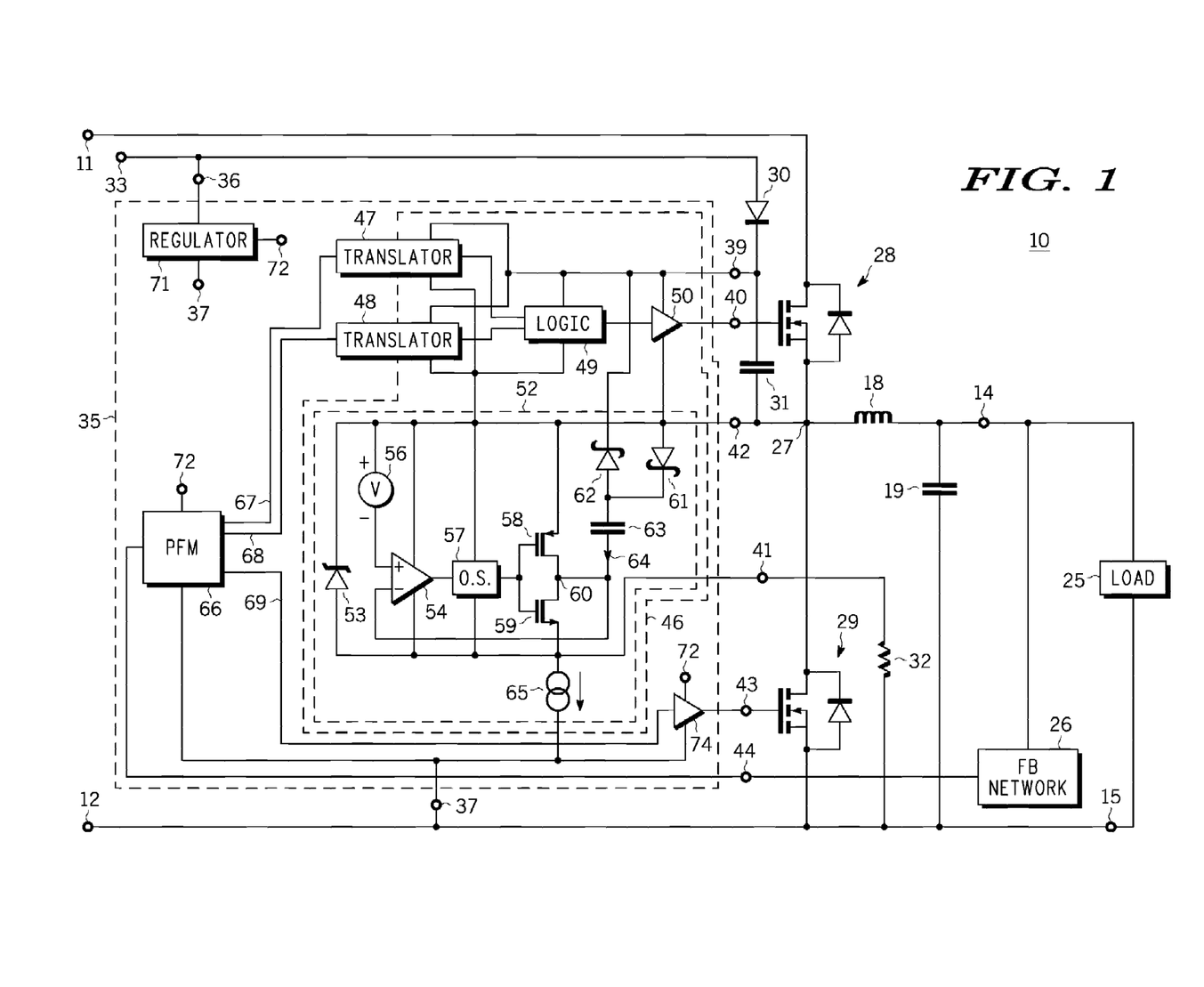
FIG. 1 schematically illustrates an embodiment of a portion of a power supply system that includes a power supply controller having a charge pump circuit in accordance with the present invention.

FIG. 1 schematically illustrates an embodiment of a portion of a power supply system 10 that includes an exemplary embodiment of a portion of a power supply controller 35 that is used to regulate an output voltage that is formed by system 10. As will be seen further hereinafter, controller 35 is configured to charge a charge pump capacitor to a first voltage and to transfer charge from the pump capacitor to another capacitor for a period of time responsively to the pump capacitor charging to the first voltage. It will also be seen that the charging of the pump capacitor is terminated based on the differential voltage across the pump capacitor and not based on the period of time that the pump capacitor is charged.

System 10 receives power, such as a rectified ac voltage, between a power input terminal 11 and a power return terminal 12 and forms an output voltage between a voltage output 14 and a voltage return 15. The voltage between terminals 11 and 12 is often referred to as a bulk voltage. System 10 is illustrated in FIG. 1 is a buck power supply system. A first power switch, such as an MOS transistor 28, and a second power switch, such as an MOS transistor 29 are connected in a stacked configuration or half-bridge configuration between terminals 11 and 12. The diodes in parallel with transistors 28 and 29 represent the body diodes of the transistors. Transistors 28 and 29 are connected together at a switch node or common node 27 of the half-bridge configuration which is also connected to an inductor 18. Although transistors 28 and 29 are illustrated as external to controller 35 in the embodiment of FIG. 1, those skilled in the art will appreciate that transistors 28 and 29 may be within controller 35 in other embodiments. Generally, inductor 18 and a capacitor 19 are connected to receive current from transistors 28 and 29 and form the output voltage between output 14 and return 15. A feedback network 26 is connected to receive the output voltage and form a feedback signal that is representative of the value of the output voltage. Feedback network 26 may be an optical coupler or other type of well-known feedback network.

In most embodiments, the voltage between terminals 11 and 12 is received from a rectified household mains. For operation in various different countries, system 10 is configured to receive a voltage between terminals 11 and 12 that may be as high as six hundred volts (600 V) or as low as two hundred fifty volts (250 V) depending on the country which is providing the voltage to terminals 11 and 12. Consequently, system 10 generally receives a lower voltage on an input 33 that is applied to controller 35 between a power input 36 and a power return 37 of controller 35. The voltage received on input 33 may be derived from the output voltage of system 10 or may be available from another source. A boost network that includes a diode 30 and a boost capacitor 31 is connected between input 33 and switch node 27 of the half-bridge. Controller 35 receives the bridge voltage from node 27 on a switch input 42. The boost network of diode 30 and capacitor 31 is used to form a boost voltage that is used for forming the drive signal for transistor 28. Controller 35 receives the boost voltage on a boost input 39. Such boost networks are well known to those skilled in the art.

Controller 35 usually includes a switching power supply circuit such as a pulse frequency modulated (PFM) controller or PFM 66 that receives the feedback signal from network 26 through a feedback input 44 of controller 35 and responsively forms PFM control signals that are used to form drive signals for transistors 28 and 29. Controller 66 may be any of a variety of well-known PFM controllers or may be a pulse width modulated (PWM) controller or a hysteretic controller. Controller 35 also includes a high-side control circuit 46 that is used to form a first drive signal for controlling transistor 28, and a low-side driver 74 that is used to form a second drive signal for controlling transistor 29. The output of circuit 46 is coupled to transistor 28 through an output 40 of controller 35, and an output of driver 74 is coupled to transistor 29 through an output 43 of controller 35. Controller 35 may also include low side logic, not shown, that assists in forming the input signal to driver 74. Additionally controller 35 may include an internal regulator 71 that is connected between input 36 and return 37 to receive the input voltage and form an internal operating voltage on an output 72 for operating elements of controller 35 such as PFM controller 66 and low-side driver 74. High-side control circuit 46 includes a driver circuit or driver 50, a logic circuit or logic 49, a charge pump circuit 52, and level shifter circuits or level translator circuits 47 and 48.

In order to form the drive signal from driver 50 at a voltage that is sufficient to enable transistor 28, at least driver 50 and usually logic 49 of high-side control circuit 46 is connected between inputs 39 and 42 in order to operate from the boost voltage. The boost voltage is formed by the charge stored on capacitor 31 as a result of the switching of transistors 28 and 29 and is the differential value between inputs 39 and 42. The average value of the boost voltage is approximately equal to the voltage received on input 36 minus the voltage drop across diode 30. When referenced to terminal 12, the instantaneous value of the boost voltage is typically oscillating, and its peak value is greater than the input voltage received on terminal 11.

As will be seen further hereinafter, high-side control circuit 46 typically is formed in an isolated or floating region of the semiconductor die on which controller 35 is formed in order to isolate the remainder of controller 35 from the boost voltage that is utilized to operate circuit 46. For embodiments where circuit 46 operates from a lower voltage that would not damage other portions of controller 35, circuit 46 may not be formed in such a floating or isolated region. Circuits 47 and 48 are configured to receive signals from PFM controller 66 and shift or translate the voltage value of the signals from the voltage that is referenced to the voltage of output 72 to a higher voltage value that is compatible with the boost voltage used for operating circuit 46. Also as will be seen further hereinafter, a portion of circuits 47 and 48 is formed in a floating region.

During operation, PFM controller 66 forms a control signal 67 that is used by circuit 46 to assert the first drive signal on output 40 and enable transistor 28. Subsequently, PFM controller 66 usually forms a second control signal 68 that is used by circuit 46 to disable transistor 28. During the time interval that transistor 28 is enabled, transistor 28 couples the voltage from input terminal 11 to node 27. Subsequently, PFM controller 66 asserts a control signal 69 that is used by driver 74 for enabling transistor 29. Negating signal 69 is used for disabling transistor 29. Switching the half-bridge forms a bridge voltage on node 27 which is received by controller 35 on switch input 42. As can be seen, the bridge voltage on input 42 is less than the boost voltage on input 39. Additionally, the switching of transistors 28 and 29 causes the bridge voltage to vary between two voltage values that are between the voltage of input terminal 11 and the voltage of return terminal 12. Thus, the value of the bridge voltage increases at least a portion of the time that transistor 28 is enabled and decreases at least a portion of the time that transistor 29 is enabled.

During operation, controller 35 may cease to switch transistors 28 and 29 for a period of time. For example, the input voltage may decrease to a value that is less than the desired output voltage value and PFM control signal 67 may cease to switch transistors 28 and 29 for a period of time that is greater than a switching cycle of controller 66. In this condition, transistor 28 generally is on and transistor 29 is off. In some cases, the period of time may be long enough for the voltage on capacitor 31 to decrease to a value that can not operate driver 50. Charge pump circuit 52 is configured to provide power to operate driver 50 during such long periods. Circuit 52 is a self-oscillating charge pump that operates independently of the switching of transistors 28 and 29.

A zener diode 53 forms an operating voltage for circuit 52 that allows circuit 52 to operate from the voltage between input 42 and an output 41. Input 42 forms the high side rail for operating circuit 52 and output 41 forms the low side rail for operating circuit 52. If transistor 28 is enabled, the bridge voltage between input 42 and return 37 may be greater than the breakdown or zener voltage of diode 53. This would cause diode 53 to conduct and clamp the voltage between the high side rail of input 42 and the low side rail of output 41 to the zener voltage of diode 53. Thus, under these conditions diode 53 forms the operating voltage for circuit 52. The zener voltage of diode 53 is selected to be a value that is suitable for operating elements of circuit 52 such as a comparator 54 and a one shot circuit 57. In the preferred embodiment, the zener voltage is approximately twenty volts (20 V). The current through diode 53 is conducted through a current source 65. In some embodiments, an optional external resistor 32 may be connected between output 41 and return 37. In such a case, a portion of the current through diode 53 is conducted through current source 65 and another portion is conducted through resistor 32. If the bridge voltage is lower than the zener voltage of diode 53, such as when transistor 28 is disabled and transistor 29 is enabled, output 41 is pulled to the voltage of return 37 so that the voltage value between input 42 and output 41 is substantially the bridge voltage. Since the bridge voltage is no greater than approximately the value of return 37, circuit 52 does not have a supply voltage and does not operate. Because circuit 52 only has to operate and supply power when transistor 28 is enabled, then not operating when the bridge voltage is very low is an acceptable condition for circuit 52. The zener voltage of diode 53 is also greater than a reference voltage of a reference circuit or reference 56.

Assume, for illustration of the operation of circuit 52, that the voltage of capacitor 63 is less than the value of reference 56. This condition forces the output of comparator 54 low. The comparator output is connected to a pulse generator circuit that is illustrated in FIG. 1 as one shot circuit 57. Circuit 57 may be formed as an edge detector circuit, such as from a series of inverters connected to a logic gate, or other well-known pulse generator circuits. The output of circuit 57 is a control signal that is used to drive an inverter formed from stacked transistors 58 and 59. The un-triggered state of circuit 57 is high and the output goes low for a time interval when circuit 57 is triggered by comparator 54. Since circuit 57 is not triggered, the output is high and transistor 59 is enabled to pull an output node 60 of the inverter low. The low on node 60 allows current source 65 to form a charging current 64 to flow through a diode 61 and transistor 59 to charge a pump capacitor 63. Diode 61 preferably is a Schottky diode. Optional external resistor 32 may be connected to output 41 to increase the amount of current used to charge capacitor 63. Without resistor 32, current 64 is approximately the current of source 65 minus the current through diode 53. Circuit 52 continues to charge capacitor 63 until the voltage on capacitor 63 reaches the value of the voltage from reference 56. The output of comparator 54 changes state to a logic high responsively to capacitor 63 charging to the value of reference 56. The high going signal from comparator 54 triggers circuit 57 and forces the output low for a time period or time interval determined by the time control element of circuit 57. The low from circuit 57 disables transistor 59 and enables transistor 58. Enabling transistor 58 applies the bridge voltage to node 60 which enables diode 62. Enabling diode 62 couples pump capacitor 63 to input 39 in parallel with boost capacitor 31 thereby enabling pump capacitor 63 to transfer charge to boost capacitor 31. The pulse width of circuit 57 is chosen to provide a sufficient time to distribute the maximum amount of charge from capacitor 63 to capacitor 31. After the time interval of the pulse from circuit 57 has expired, the output of circuit 57 again goes high which disables transistor 58 and enables transistor 59 thereby again charging capacitor 63 with current 64. This cycling of circuit 52 continues during the operation of controller 35. As can be seen from the description, circuit 52 is a self-oscillating charge pump circuit that cycles independently of the switching of transistors 28 and 29, thus, the charging interval of capacitor 63 is a function of the voltage stored on capacitor 63 and a function of time. The voltage on node 27 and input 42 changes as transistors 28 and 29 are enabled and disabled, however, circuit 52 always charge capacitor 63 to the fixed voltage of reference 56.

Because circuit 52 has the upper voltage supply for the high side rail connected to input 42 and the lower voltage supply for the low side rail connected to output 41, circuit 52 follows the voltage on node 27. For example, if transistor 28 is enabled, the voltage on node 27 is pulled to the voltage of terminal 11, and if transistor 29 is enabled, node 27 is pulled to the voltage of return terminal 12. When the voltage on node 27 is greater than the voltage of reference 56, charge pump circuit 52 is operating and cycling to charge capacitor 63 to the voltage of reference 56 and then transfer charge from capacitor 63 to capacitor 31 for the time interval defined by the pulse width of circuit 57.

Since the charge supplied from capacitor 63 is only needed when drivers 50 and 74 along with respective transistors 28 and 29 are not switching, the current required during the non-switching time is very small and the charge needed from capacitor 63 is also small. Therefore, capacitor 63 can be integrated onto a semiconductor die along with the circuitry of controller 35. In one embodiment, capacitor 63 is approximately twenty pico-farads (20 pf) and the width of the pulse generated by circuit 57 is approximately one hundred nano-seconds (100 nsec). For a larger value of capacitor 63, the frequency of the cycling of circuit 52 decreases.

In order to facilitate this functionality for controller 35, input 36 is configured to receive a voltage that is less than the bulk voltage and return 37 is configured to be connected to terminal 12. Input 39 is configured to receive the boost voltage. Regulator 71 is connected between input 36 and return 37 to form an internal operating voltage on output 72. PFM controller 66 is connected between output 72 and return 37 and also has a feedback control input connected to input 44 to receive the feedback signal from feedback network 26. The PFM 66 output for signal 69 is connected to the input of driver 74. The output of driver 74 is connected to output 43 which is configured to be connected to a gate of transistor 29. An input of circuit 47 is connected to receive signal 67 from PFM 66 and an output is connected to a first input of logic 49. An input of circuit 48 is connected to receive signal 68 from PFM 66 and an output is connected to a second input of logic 49. An output of logic 49 is connected to an input of driver 50 and an output of driver 50 is configured to be connected to output 40 and a gate of transistor 28. An anode of diode 53 is connected to a first terminal of current source 65. A second terminal of current source 65 is connected to return 37. A cathode of diode 53 is connected to a first terminal of reference 56 which has a second terminal connected to a non-inverting input comparator 54. An inverting input of comparator 54 is connected to node 60. An output of comparator 54 is connected to an input of circuit 57, and an output of circuit 57 is connected to a gate of transistor 58 and a gate of transistor 59. A source of transistor 59 is connected to the first terminal of current source 65. A drain of transistor 59 is connected to node 60 and to a drain of transistor 58. A source of transistor 58 is commonly connected to the cathode of diode 53, an anode of diode 61, and to input 42. A cathode of diode 61 is connected to an anode of diode 62 and a first terminal of capacitor 63. A cathode of diode 62 is connected to input 39. A second terminal of capacitor 63 is connected to node 60. Comparator 54 and circuit 57 are connected to receive power between the high side power supply rail that is connected to the cathode of diode 53 and the low side power supply rail is connected to the anode of diode 53. Driver 50, logic 49, and circuits 47 and 48 are connected to receive power between input 39 and input 42.

Figure 2:
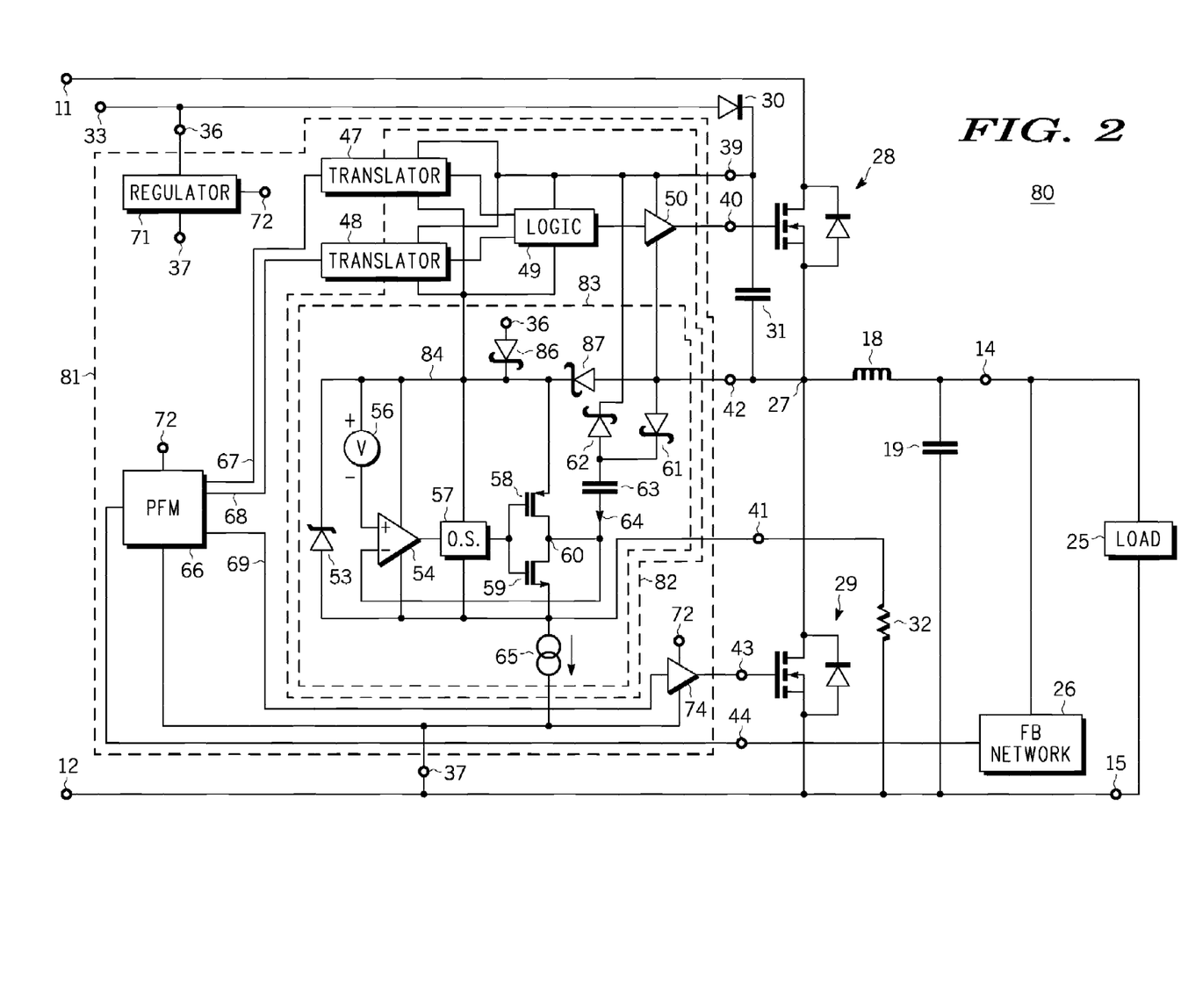
FIG. 2 schematically illustrates an embodiment of a portion of another power supply system that includes another power supply controller having a charge pump circuit in accordance with the present invention.

FIG. 2 schematically illustrates an embodiment of a portion of a power supply system 80 that is an alternate embodiment of system 10 that was described in the description of FIG. 1. System 80 includes a power supply controller 81 that is an alternate embodiment of controller 35 that is also described in the description of FIG. 1. Controller 81 is the same as controller 35 except that controller 81 includes a charge pump circuit 83 that is an alternate embodiment of charge pump circuit 52 that was also described in the description of FIG. 1. Circuit 83 is the same as circuit 52 except that circuit 83 has additional diodes 86 and 87 that form a different connection to node 27.

In some cases, the voltage on node 27 may become negative relative to terminal 12. In such a case, the isolated region in which circuit 52 (FIG. 1) is formed may trigger a parasitic substrate bipolar transistor. Diode 86 clamps the floating upper power supply rail of a node 84 to the voltage of input 36 to prevent enabling the parasitic bipolar transistor. Diode 87 is also added to buffer the voltage of node 84 from node 27.

Circuit 83 is connected similarly to circuit 52 except that an anode of diode 86 is connected to input 36 and a cathode is connected to the source of transistor 58. Also, diode 87 is inserted between the source of transistor 58 and the anode of diode 61 such that the anode of diode 87 is connected to the anode of diode 61 and to input 42. The cathode of diode 87 is connected to the cathode of diode 86 and to the source of transistor 58.

Figure 3:
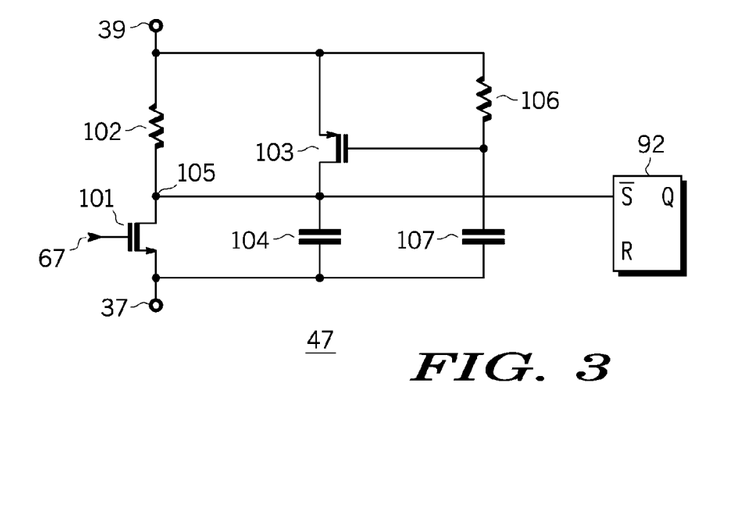
FIG. 3 schematically illustrates an embodiment of a portion of a shifter circuit of the power supply controller of FIG. 1 in accordance with the present invention.

FIG. 3 schematically illustrates an embodiment of a circuit suitable for use as circuits 47 and 48. Level translator circuit 47 is utilized to shift or translate the voltage of the logic levels of the control signal, such as control signal 67, from the voltage of regulator 71 to the boost voltage on input 39. Translator circuit 47 receives PFM control signal 67 and forms a negative going pulse upon receiving the rising edge of signal 67. The high of signal 67 enables transistor 101 to pull the set bar input low and set latch 92. Because the boost voltage on input 39 may have abrupt changes during the operation of transistor 28 and because the drain of transistor 101 has parasitic capacitances to the substrate represented as capacitor 104, circuit 47 also includes a transistor 103, a capacitor 107, and resistor 106 that prevents the abrupt changes of the boost voltage from altering the output of circuit 47. An abrupt change in the boost voltage would be coupled across capacitor 104 and create a current flow through resistor 102 in order to begin charging capacitor 104. This could produce an unwanted parasitic set pulse for latch 92. But, the rapid voltage change forms a current change through resistor 106 and a resulting current flow therethrough in order to begin charging capacitor 107. The current flow to capacitor 107 forms a voltage drop across resistor 106 that enables transistor 103. Transistor 103 turns-on which begins conducting current to charge capacitor 104 and clamp the value of the voltage on the set bar input of latch 92 to a voltage substantially equal to the value of the boost voltage on input 39. Enabling transistor 103 prevents the rapid change in the value boost voltage from falsely changing the state of latch 92.

Figure 4:
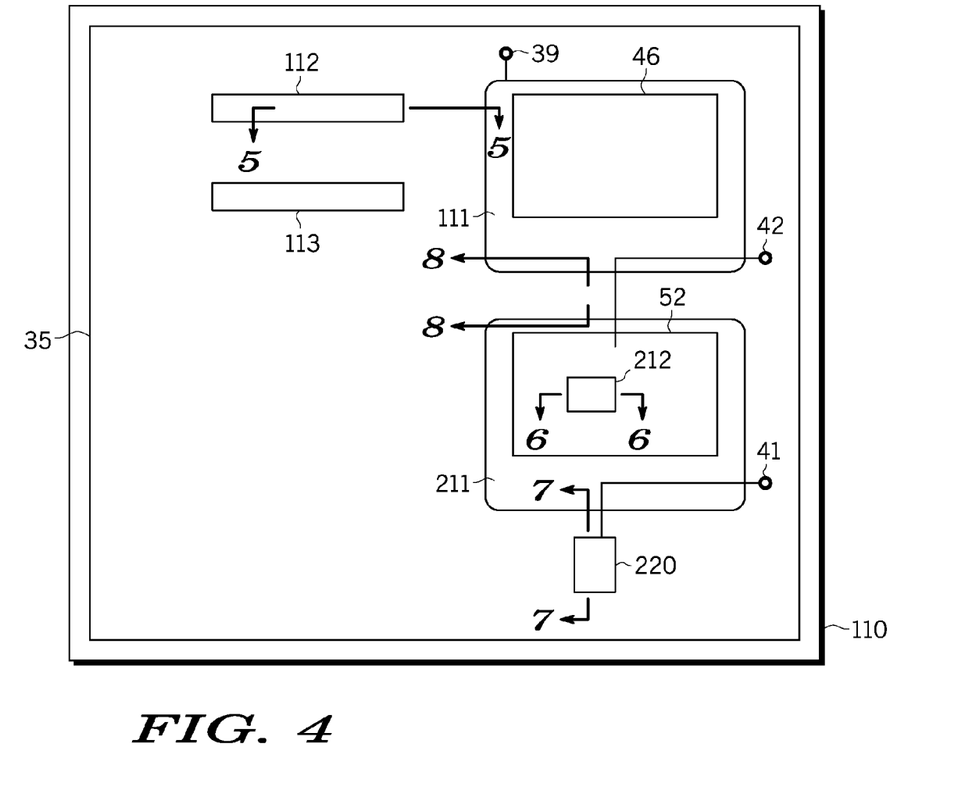
FIG. 4 illustrates a simplified enlarged plan view of a semiconductor die on which the power supply controller of FIG. 1 is formed in accordance with the present invention.

FIG. 4 illustrates an enlarged simplified plan view of a semiconductor die 110 on which controller 35 is formed. Controller 35 is illustrated in general manner by a box bearing the number 35. A portion 112 includes at least transistor 101 of translator circuit 47 that was illustrated in FIG. 3. A portion 113 includes portions of translator circuit 48 that was illustrated in FIG. 1. Controller 35 and is formed on die 110 by semiconductor manufacturing techniques that are well known to those skilled in the art.

Figure 5:
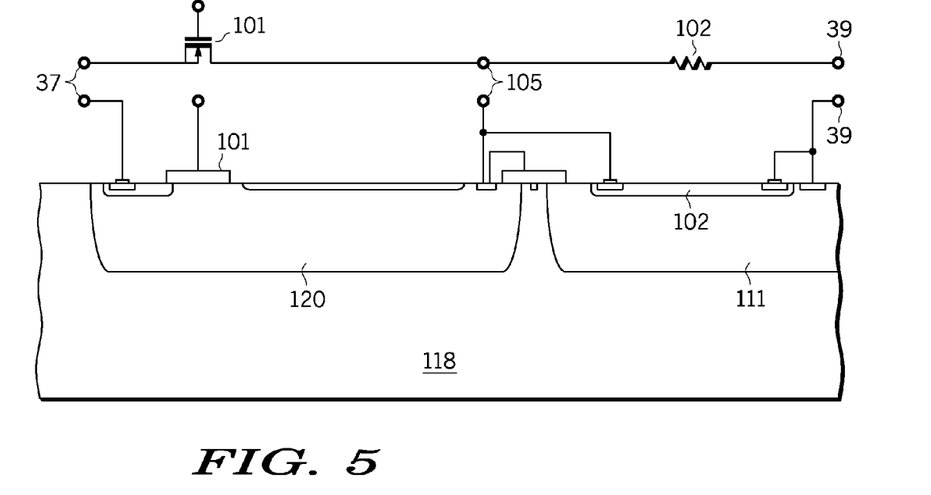
FIG. 5 illustrates a simplified enlarged cross-sectional view of a first portion of the semiconductor die of FIG. 4 in accordance with the present invention.

FIG. 5 illustrates an enlarged simplified cross-sectional view of die 110 taken along cross-section line 5-5. Cross-section line 5-5 is formed through transistor 101 and resistor 102 that are illustrated in FIGS. 3 and 4. This description has references to FIG. 4 and FIG. 5. A doped region 111 forms the first isolated region in which some of the elements of circuit 46 are formed including logic 49, driver 50, and a portion of translator circuits 47 and 48. Typically, the portion of circuits 47 and 48 that includes capacitor 107, resistors 106 and 102, and transistor 103 are also formed within region 111. Die 110 is formed on a semiconductor substrate 118. Doped region 111 is formed on a surface of substrate 118 and has a conductivity type that is opposite to the conductivity of substrate 118. A doped region 120 is formed on the surface of substrate 118 spaced apart from region 111 to form transistor 101. Region 120 has a conductivity type that is opposite to the conductivity of substrate 118. Resistor 102 is formed as a doped region 102 within region 111. Region 102 is formed to have a conductivity type that is opposite to the conductivity of region 111. Doped region 120 is connected to resistor 102 by a conductor, such as a metal, that also provides a connection to node 105. An example of using a doped region such as region 111 to isolate portions of a circuit from other portions of a circuit is described in U.S. Pat. No. 6,097,075 issued to Antonin Rozsypal et al on Sep. 13, 2005.

Figure 6:
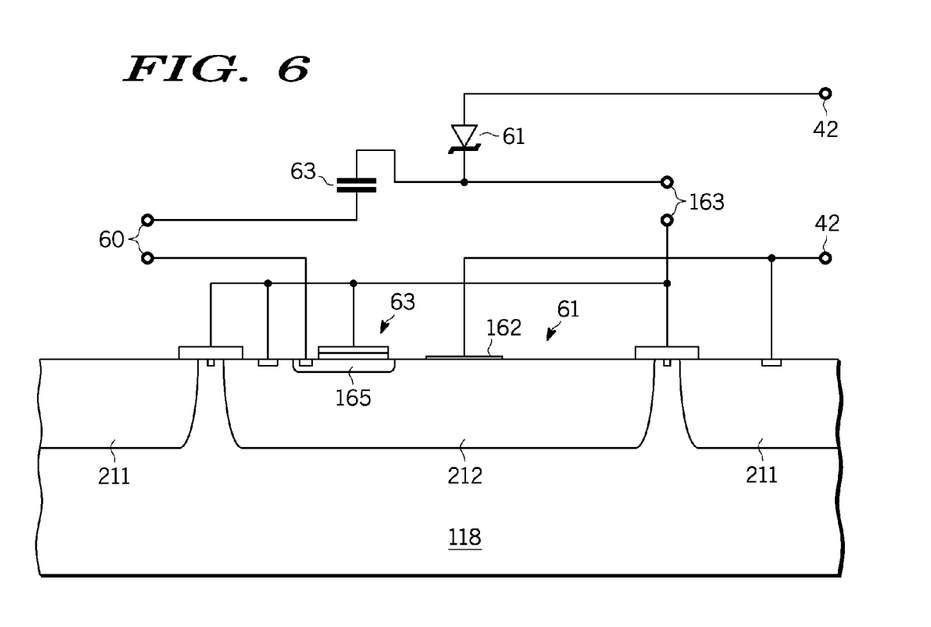
FIG. 6 illustrates an enlarged simplified cross-sectional view of a second portion of the semiconductor die of FIG. 4 in accordance with the present invention.

FIG. 6 illustrates an enlarged simplified cross-sectional view of die 110 taken along cross-section line 6-6. Cross-section line 6-6 is formed through region 211 and through a doped region 212. Region 212 is used to assist in forming capacitor 63 and diode 61. Region 212 is formed as a doped region on the surface of substrate 118 and within region 211. Region 212 has a conductivity type that is opposite to the conductivity type of substrate 118 and the same as region 211. Region 212 functions as the cathode of diode 61 and a metal 162 that is formed on the surface of region 212 and electrically connected to region 212 forms the anode of diode 61. Note that region 212 is surrounded by region 211 and separated from region 211 by a distance or gap. A doped region 165 that is formed within region 212 forms a first plate of capacitor 63. The dielectric of capacitor is formed by an insulator that overlies a portion of region 165, and a conductor is formed on the insulator to form the second plate of capacitor 63. A first terminal of capacitor 63, represented as a node 163, is commonly connected to the anode of diode 62 (see FIG. 1) and cathode of diode 61. A second terminal of capacitor 63 is connected to node 60.

Figure 7:
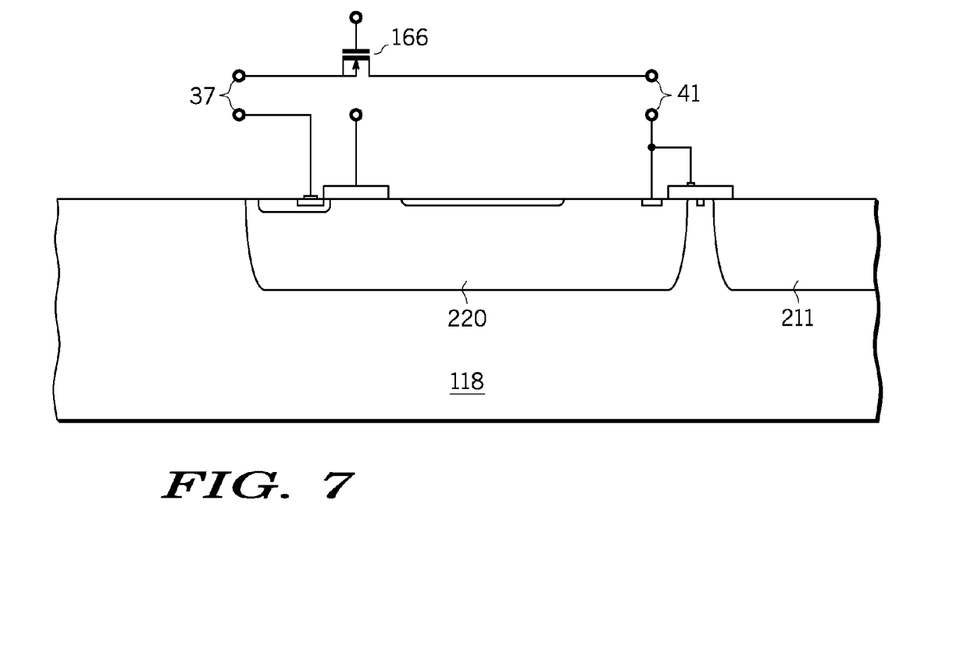
FIG. 7 illustrates an enlarged simplified cross-sectional view of a third portion of the semiconductor die of FIG. 4 in accordance with the present invention.

FIG. 7 illustrates an enlarged simplified cross-sectional view of die 110 taken along cross-section line 7-7. Cross-section line 7-7 is formed through current source 65. A doped region 220 is formed on the surface of substrate 118 and has a conductivity type opposite to the conductivity of substrate 118. An LDMOS transistor 166 that is a portion of current source 65 is formed within region 220.

Figure 8:
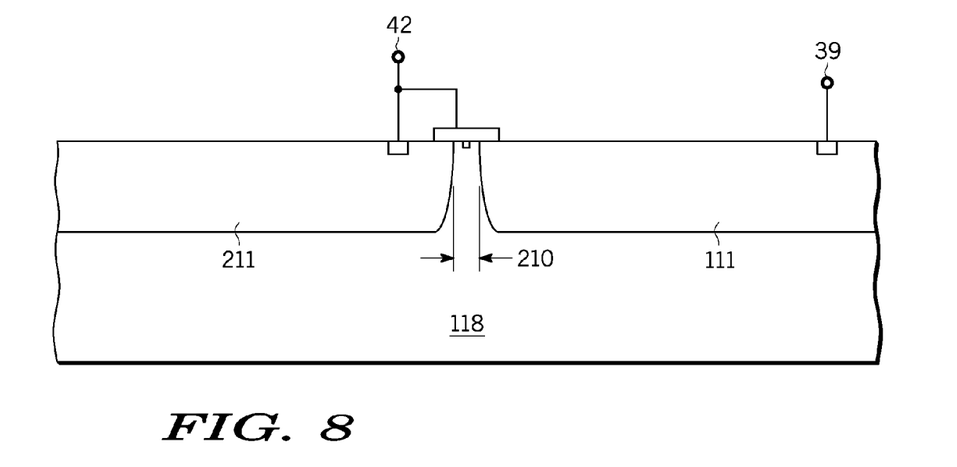
FIG. 8 illustrates an enlarged simplified cross-sectional view of a fourth portion of the semiconductor die of FIG. 4 in accordance with the present invention.

FIG. 8 illustrates an enlarged simplified cross-sectional view of die 110 taken along cross-section line 8-8. Cross-section line 8-8 is formed through regions 111 and 211. Regions 111 and 211 are separated by a distance 210. Distance 210 functions as an isolating gap that facilitates allowing a voltage difference between the voltages of regions 111 and 211 without affecting the breakdown voltage of circuit 52.

In view of all of the above, it is evident that a novel device and method is disclosed. Included, among other features, is forming a charge pump circuit that charges a pump capacitor until the voltage across the capacitor reaches a certain value, then transferring at least a portion of the charge to a boost capacitor of a power supply system. Charging the boost capacitor independently of the timing used to switch transistors 28 and 29 facilitates charging the pump capacitor when transistors 28 and 29 are not operating which allows using the pump capacitor to keep the boost capacitor charged.

While the subject matter of the invention is described with specific preferred embodiments, it is evident that many alternatives and variations will be apparent to those skilled in the semiconductor arts. Although controller 35 is illustrated as a portion of a buck power supply system, controller 35 may be used in other power supply configurations. Additionally, the subject matter of the invention has been described for a particular N-channel and P-channel transistors, although the method is directly applicable to bipolar transistors, as well as to other MOS, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A charge pump circuit comprising:
a first capacitor having a first terminal and a second terminal;
a first input configured for coupling to a common node that is between first and second power switches that are coupled in a stacked configuration wherein an inductor is coupled to the common node, the first input configured to receive a first voltage from the common node;
a second input configured to receive a second voltage from a second capacitor wherein the second voltage is greater than the first voltage, the second capacitor having a first terminal for coupling to the first input and a second terminal for coupling to the second input;
a current source having a first terminal and a second terminal;
a first circuit configured to charge the first capacitor from the first voltage and provide a first current from the first input to the first capacitor and to the current source responsively to the first capacitor having a voltage that is less than a third voltage wherein the third voltage is less than the first voltage; and
a second circuit configured to couple the first capacitor to the second voltage at the second input and transfer charge from the first capacitor to the second capacitor responsively to the voltage of the first capacitor being at least equal to the third voltage.

2. The charge pump circuit of claim 1 wherein the first circuit is configured to charge the first capacitor to the third voltage.

3. The charge pump circuit of claim 1 wherein the first terminal of the current source is coupled to a first current carrying electrode of a first transistor and a second current carrying electrode of the first transistor is coupled to the first terminal of the first capacitor, the first transistor having a control electrode.

4. The charge pump circuit of claim 1 wherein the first circuit includes a first diode having a cathode coupled to the second terminal of the first capacitor and an anode coupled to receive the first voltage.

5. The charge pump circuit of claim 4 wherein the second circuit includes a second diode having a cathode coupled to receive the second voltage and an anode coupled to the second terminal of the first capacitor.

6. The charge pump circuit of claim 5 wherein the first terminal of the current source is coupled to a first current carrying electrode of a first transistor and a second current carrying electrode of the first transistor is coupled to the first terminal of the first capacitor, the first transistor having a control electrode, and a second transistor having a first current carrying electrode coupled to the second current carrying electrode of the first transistor, a second current carrying electrode coupled to receive the first voltage, and a control electrode.

7. The charge pump circuit of claim 1 further including a pulse generator operably coupled to form a control signal used to couple the first capacitor to transfer charge to the second capacitor for a first period of time responsively to the voltage of the first capacitor being substantially the third voltage.

8. The charge pump circuit of claim 7 further including a comparator configured to compare the voltage of the first capacitor to the third voltage and form a control signal to enable the pulse generator.

9. The charge pump circuit of claim 1 wherein the second capacitor is a boost capacitor of a power supply circuit that is used to provide power to a high side driver of the power supply circuit.

10. A method of forming a charge pump circuit comprising:
configuring a first input of the charge pump circuit for coupling to a bridge node that is between first and second power switches that are coupled in a stacked configuration wherein the bridge node is configured for coupling to an inductor and to a first capacitor;
coupling a first switch between a current source and a pump capacitor of the charge pump circuit;
configuring the charge pump circuit to enable the first switch and couple the pump capacitor to a voltage node and provide a first current from the first input through the first switch to the current source to charge the pump capacitor to a first voltage responsively to a voltage on the capacitor having a value that is less than the first voltage wherein the first voltage is different from a voltage on the voltage node; and
configuring the charge pump circuit to disable the first switch and transfer charge from the pump capacitor through a second input of the charge pump circuit and to the first capacitor for a first period of time responsively to a voltage of the pump capacitor being at least the first voltage.

11. The method of claim 10 further including configuring the charge pump circuit to repeat the sequence of charging the pump capacitor to the first voltage and transferring charge to the first capacitor.

12. The method of claim 10 wherein configuring the charge pump circuit to charge the pump capacitor to the first voltage includes configuring the charge pump circuit to terminate charging the pump capacitor as a function of the first voltage and not as a function of time.

13. The method of claim 10 wherein configuring the charge pump circuit to charge the pump capacitor to the first voltage includes configuring the charge pump circuit to operate from a variable supply voltage wherein the first voltage is fixed as the supply voltage varies.

14. The method of claim 10 wherein configuring the charge pump circuit to transfer charge from the pump capacitor to the first capacitor includes configuring the charge pump circuit to transfer charge from the pump capacitor to a boost capacitor of a power supply system wherein the boost capacitor supplies power to a high side driver of the power supply system.

15. The method of claim 10 wherein configuring the charge pump circuit to transfer charge from the pump capacitor to the first capacitor includes configuring the charge pump circuit to compare the voltage of the pump capacitor to a fixed reference voltage.

16. The method of claim 10 further including coupling an operating voltage circuit to the current source to supply an operating voltage for the charge pump circuit wherein the operating voltage is greater than the first voltage.

17. A method of forming a charge pump circuit comprising:
configuring a first input of the charge pump circuit for coupling to a bridge node that is between first and second switches that are coupled in a stacked configuration wherein the bridge node is configured for coupling to an inductor, the first input configured to receive a first voltage from the bridge node;
configuring the charge pump circuit to couple a pump capacitor to a voltage node and provide a first current from the first input through a first switch to a current source to charge the pump capacitor during a charging interval and terminate charging the pump capacitor responsively to a voltage of the pump capacitor being greater than approximately a first voltage wherein the first voltage is different from the voltage on the voltage node; and
configuring the charge pump circuit to disable the first switch and transfer charge from the pump capacitor to another capacitor responsively to the voltage of the pump capacitor wherein the transfer occurs for a first time period and terminates upon termination of the time period.

18. The method of claim 17 wherein configuring the charge pump circuit to couple the pump capacitor to the voltage node includes coupling the charge pump circuit to operate from a second voltage that is greater than the first voltage and varies for at least a portion of the charging interval, and coupling the charge pump circuit to couple the pump capacitor to a third voltage that is greater than the second voltage at least a portion of the first period of time.

19. The method of claim 17 wherein configuring the charge pump circuit couple the pump capacitor to the voltage node includes configuring the charge pump controller to generate a control pulse having a duration of the first period of time responsively to the voltage of the pump capacitor being greater than approximately the first voltage.

20. The method of claim 17 further including forming the charge pump circuit and the pump capacitor on a semiconductor die as a portion of a power supply controller.

21. The method of claim 20 further including coupling the another capacitor to supply operating power to a high side driver of the power supply controller wherein the high side driver is formed on the semiconductor die.

* * * * *